No. 815,459. PATENTED MAR. 20, 1906.
A. S. McALLISTER.
ALTERNATING CURRENT MACHINERY.
APPLICATION FILED DEC. 14, 1903.
4 SHEETS—SHEET 1.
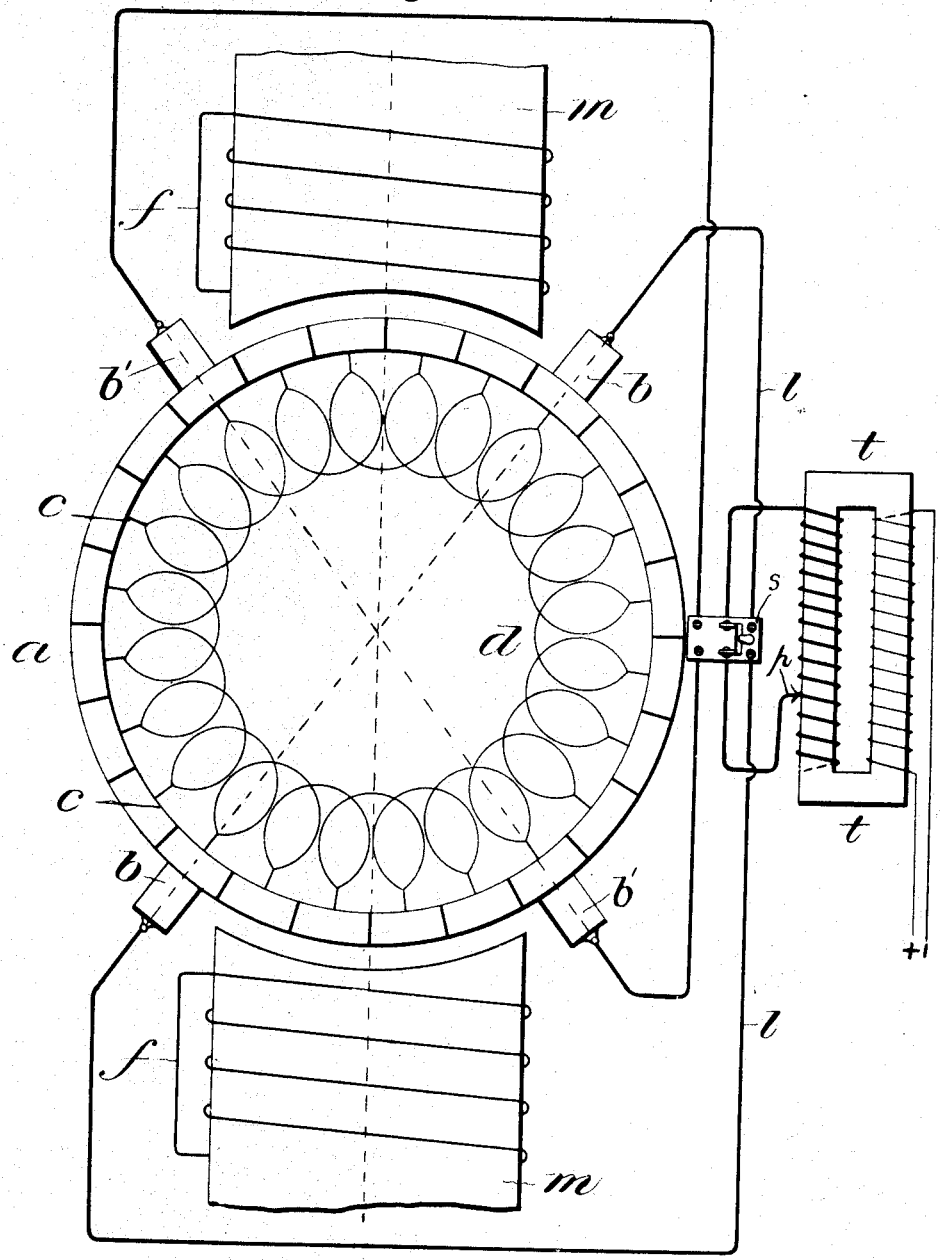

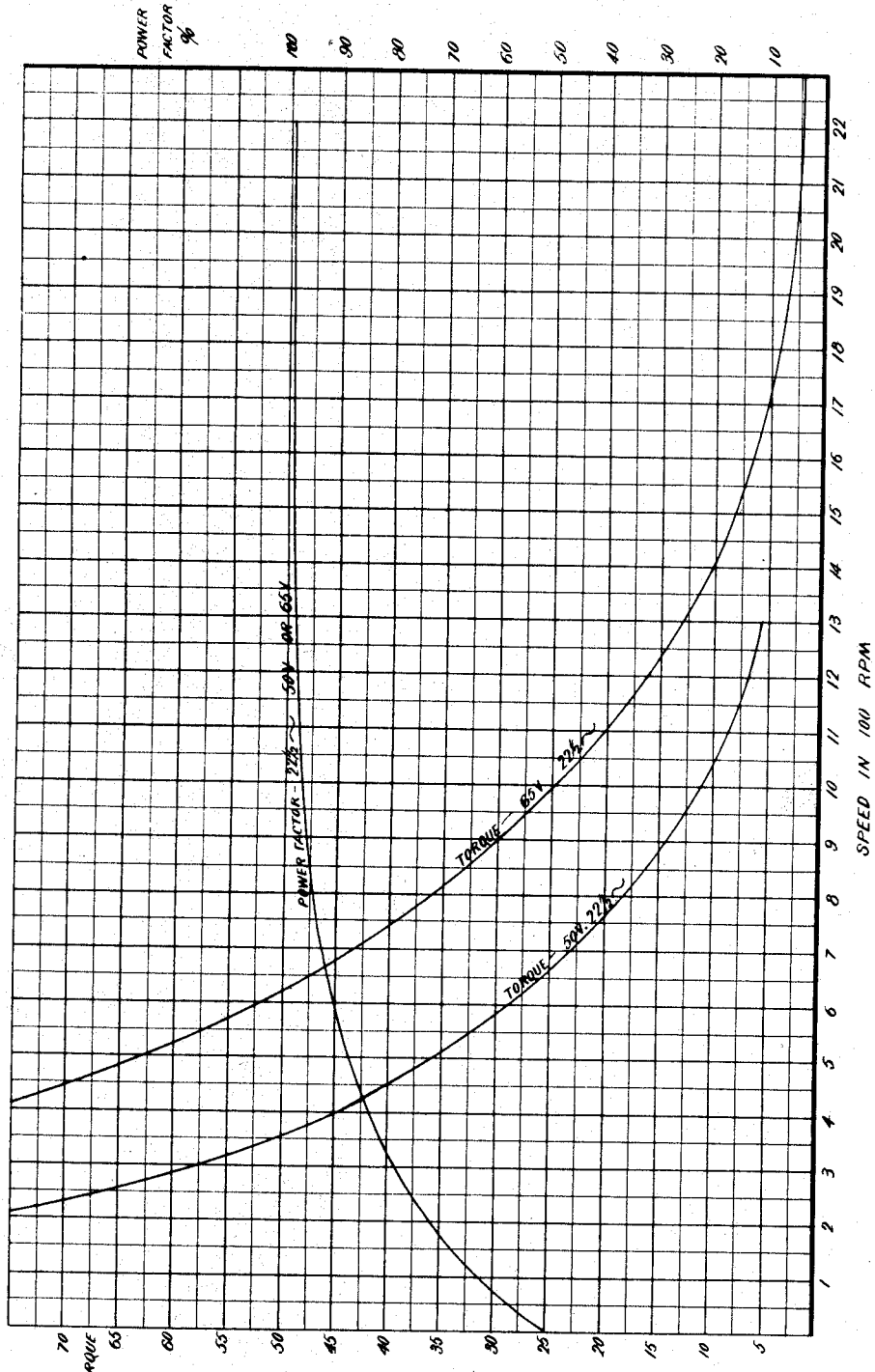

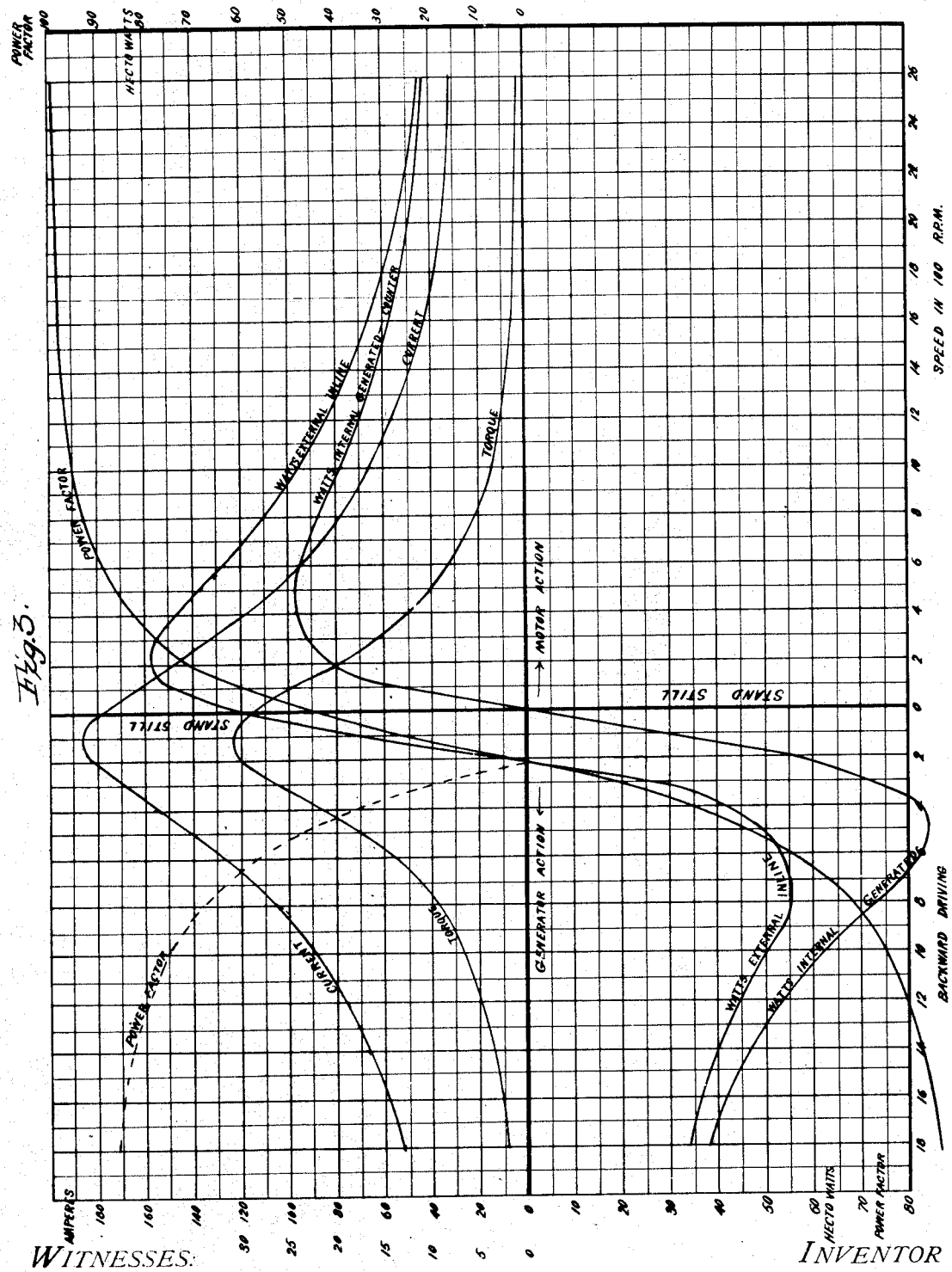

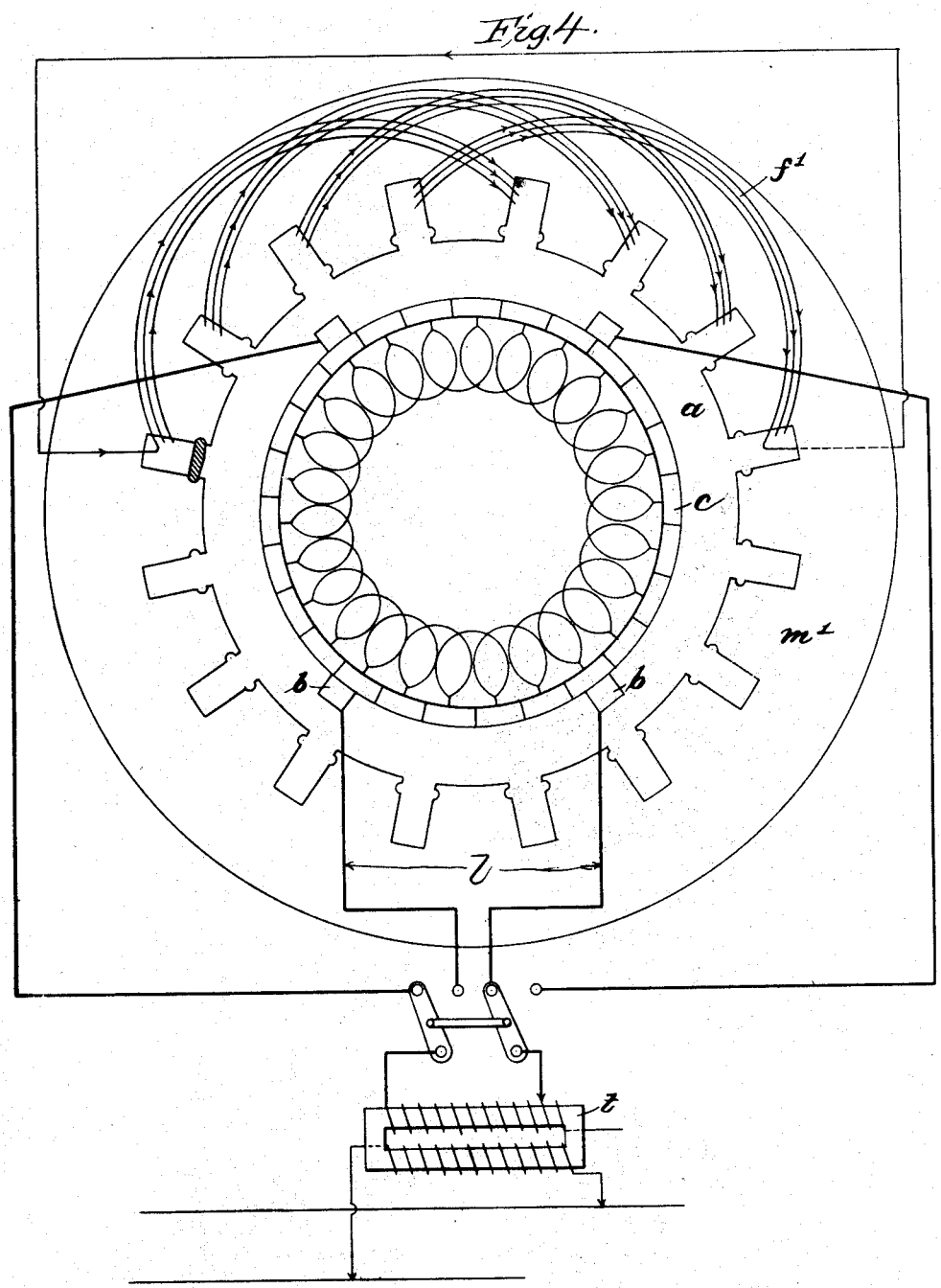

UNITED STATES PATENT OFFICE.

ADDAMS STRATTON McALLISTER, OF ITHACA, NEW YORK.

ALTERNATING-CURRENT MACHINERY.

No. 815,459.  Specification of Letters Patent.  Patented March 20, 1906.

Application filed December 14, 1903. Serial No. 185,069.

*To all whom it may concern:*

Be it known that I, ADDAMS STRATTON MC-ALLISTER, a citizen of the United States, and a resident of Ithaca, in the county of Tompkins and State of New York, have invented certain new and useful Improvements in Alternating-Current Machinery, of which the following is a specification, reference being had to the accompanying drawings, forming part of the same.

My invention relates to improvements in single-phase alternating-current machinery; and the object of my invention is to provide a variable-speed single-phase alternating-current motor having the mechanical characteristics of the direct-current series motor capable of overcoming in its operation the difficulties encountered with other variable-speed alternating-current motors and susceptible of use at will as either a motor or a generator.

A machine embodying my new invention operates at a power factor much higher than that of any induction-motor heretofore known to me.

In the drawings, which illustrate the principle of my new invention and the best form in which I have contemplated applying that principle, Figure 1 is a diagrammatic elevation of my new motor, (or generator,) and Figs. 2 and 3 show curves which represent graphically the performance of my new machine both as a motor and as a generator. Fig. 4 shows a uniformly-slotted field-core with coils so interconnected as to form definite field magnetic poles when current flows in said coils, it being understood that only half the winding is shown.

The rotatory armature or rotor $a$ is provided with a commutator $c$, to which a single-phase alternating current is fed by the brushes $b\ b$, connected by the lead-wires 1, 1, to any suitable source of such current—as, for example, the transformer $t$. The field-magnet cores $m$ are provided with field-coils $f$, which are closed upon themselves and which are free from electrical connection with any outside source of current-supply. As shown in the drawings, the line connecting the brushes $b$ makes a certain angle with the axial line of the field-magnets. The current which enters the armature-winding $d$ through the brush $b$ and commutator $c$ and flows therethrough causes the formation of magnetic poles upon the armature-core, and these magnetic poles, alternating, as they do, with the rise and fall of the current and the change in its direction, generate an electromotive force in the field-coils $f$. Due to this electromotive force a current flows in the coils $f$ and produces magnetic poles in the stationary field-cores $m$. The armature-current, which flows in the neighborhood of the field-poles thus produced, gives to the rotor $a$ a torque in much the same way as with the direct-current series motor, and, due to this torque, rotary motion of the rotor $a$ results. As the speed of the rotor $a$ increases the motion of its conductors through the magnetic field generates in said conductors an electromotive force which appears at the commutator as a counter electromotive force which weakens the effective electromotive force, and therewith the armature-current, the armature-core magnetism, the field-current, and the field-core magnetism. Thus there results from increased speed of the rotor $a$ a reduced torque just as occurs in direct-current series motors. Hence my new machine being a variable-magnetism machine differs from constant-magnetism machines, in which the amount of field-core material must be enough to accommodate the flux, which in such machines depends for its value upon the voltage and is not decreased with increase of speed, but, on the contrary, increases with any increase of speed obtained by increase of voltage, as in the ordinary method of regulation, while in my machine it is necessary to provide only an amount of field-core material sufficient to accommodate the flux at starting, and since this flux decreases with an increase of speed, howsoever obtained, there obviously results a saving of core material. By increasing the applied electromotive force an increase of torque can be obtained at even higher speeds, and my new motor tends to increase indefinitely the speed of its rotor as the applied electromotive force is increased or as the counter torque is decreased. Thus my new motor differs essentially from those motors in which there is a revolving field. In this latter type of motors (revolving field-induction motors) the tendency is to attain a definite limiting speed, a tendency entirely absent in my new motor. Again, as the speed of the armature or rotor $a$ increases the power factor of the current supplied thereto increases. This may be explained as follows: When the rotor is stationary, the apparent impedance of the motor, which impedance limits the flow of current to the motor, has two components—viz., the power and the reactive—as will be understood by all skilled in this art. Let X equal or represent the local reactance of the windings of the machine with its rotor stationary; R, the combined resistance of the coils of the rotor and fields; P, a variable coefficient depending upon the position of the brushes, and S the speed. Then the apparent impedance of the motor can be represented by the equation, (as a first approximation,)

$$\text{Apparent impedance} = Z = \sqrt{X^2 + (R+PS)^2};$$

but current equals electromotive force divided by impedance or $I = \frac{E}{Z}$; and $$\text{Power factor} = (R+PS) \div \sqrt{X^2 + (R+PS)^2}.$$

I have found that as the speed increases the reactive (X) component of the apparent motor impedance (Z) for a certain position or setting of the brushes remains practically constant, while the apparent power component thereof increases practically directly with the speed due to the generated counter electromotive force of the armature, which is in phase with the current supplied. From a consideration of these facts and of the relations expressed mathematically above the power component continually approaches in value the apparent motor impedance as the speed is increased, the position of the brushes (and therefore the coefficient P) remaining constant. Hence the power factor, the ratio of the power component, (R+PS,) and the apparent motor impedance continually approaches unity and is in my new motor higher at any operating speed than that of any other alternating-current induction-motor without auxiliary devices heretofore known to me. Let rotation of the rotor in the direction produced by the electrical (its own) torque be considered positive. Then may rotation in the contrary direction (against its own torque, produced by mechanical or other extraneous means) be considered negative. Since the power component of the motor impedance has a certain value at zero speed (or with rotor stationary) and increases, as above explained, with increase of speed, it should follow that by driving the rotor in a negative direction the apparent power component (in this case R−PS, S being now negative) will reduce to zero and disappear. The power factor then reduces to zero, and the current supplied to the motor will represent no energy flowing either to or from the motor. This will be apparent from the relations above set forth, as well as by the relations algebraically expressed by the equation, $$\text{Power} = I\,E \cos \Theta = \text{the ratio } \frac{E^2(R-PS)}{X^2 + (R-PS)^2}$$

the negative sign being due to the direction of rotation of the rotor and the expression reducing to zero for zero value of the apparent power component, R−PS. A further increase of speed in a negative direction (backward driving in Fig. 2 or generator action) will manifestly cause the expressions for the power factor and for the power to become negative, the interpretation of which is that the machine is now being operated as a generator and is supplying energy to the line. Energy is flowing from the machine. This is not a mere theoretical deduction, but has been amply proved by me in practical tests, the results of some of which are shown graphically by the performance curves in Fig. 2. If, then, during operation as a motor at a certain speed the connections to the rotor be so changed as to tend to drive the rotor in the opposite direction, not only will a braking effect be produced by such change, but also will energy be transmitted from the machine to the line. For example, the direction of the torque existing during the operation of the machine as a motor may be reversed by altering the relative position of the brushes with respect to the field-coils $f$. By the employment of two sets of brushes properly located with respect to the field-coils and only one set of which is used at any given instant the reversal of the torque may be accomplished from any convenient position, however far removed from the brushes themselves it may be. Wherever desirable, suitable devices may be employed to throw out of action such brushes as it is desired to render idle at any given time, and such devices may be designed so that the operation of throwing one set of brushes into active use simultaneously renders idle the other set of brushes. In Fig. 1 I have shown a second set of brushes $b'$, the two sets of brushes being symmetrically disposed with respect to the axial line of the field-magnet cores $m$. By means of a switch $s$ one set of these brushes may be brought into active use, while the other set is made idle, and thereby a reversal of the torque may be caused to take place with the useful effects above described. This characteristic of my new machine is considered by me of great value for variable-speed operation, in which respect it is preferable to any type of electric motor heretofore known to me.

I have found that the torque exerted by my new motor varies throughout its whole operating range quite closely as the square of the current value and is in this respect independent of the speed of the rotor or of the method by which current variation may be obtained in much the same way as is true with direct-current series motors.

In the operation of my new motor I consider a low frequency, while not essential, desirable on account of the increase of the power factor with the relative decrease of the reactive component of the apparent motor impedance, as has been fully set forth above.

As with direct-current series motors, a low electromotive force at the commutator is preferable to a high one and the electromotive force so applied at the commutator can be varied throughout any desired range by a suitable transformer $t$, the primary of which receives current from the source of supply at a constant difference of potential and the active portion of the secondary of which may be varied as desired by the shifting of the contact-piece $p$. Again, this variation in the electromotive force applied at the commutator provides an economical method of speed control of the rotor in service. While the series-parallel method of control can be applied to my new motor with as good an effect as to the series motor, (direct current,) the most economical method of control is by variation of the impressed electromotive force without the use of resistance, one method for doing which is above set forth, and in this respect my new motor is preferable to the direct-current series motor with its regulating resistance. Therefore a decided advantage in speed control results in the use of the reducing-transformers permissible in the operation of my new motor. Moreover, the electromotive force applied at the commutator is most efficiently varied by means of transformers and can be by them kept at the relatively low value so desirable in commutator operation. Again, since the motor or impressed electromotive force can thus be derived by transformation in my new motor the circuit electromotive force can be placed at any value suitable for transmission, and the whole transmission system becomes much simplified in consequence thereof.

In the drawings I have shown my invention as embodied in a bipolar motor with projecting poles; but it will be evident to any one skilled in this art that my invention can be applied to and embodied in a motor having any number of poles and also to and in a motor with conductors in the armature thereof which are interconnected by any of the methods now in use in direct-current machines. It will also be equally evident to such a person that instead of the projecting poles shown in the drawings a uniformly-slotted field-core with coils so interconnected as to form definite field magnetic poles when current flows in said coils may be used, and, indeed, this latter arrangement will in many cases prove in my judgment preferable.

So far as known to me there has not been previously produced any motor possessing the characteristics of my new motor by any method of application or method of operation. I therefore desire to be understood as claiming my invention in the broadest legally permissible manner.

The fact, of which I am aware, that there has been previously shown and described a motor in which an alternating current is fed to the field-coils in quadrature with which are masses of magnetic material, the coils upon the rotor being connected in the usual manner with a commutator, against which press a pair of interconnected brushes, in no wise detracts from the novelty of my invention. Such a motor is described in the United States patent to Child, No. 528,121, October 23, 1894, and possesses in operation the great disadvantage that an increase of speed causes an increase in the reactive component of the motor impedance, with the result, evident to all skilled in this art, that the power factor is greatly reduced at even moderately high speeds. In such a motor the relation between the torque and the square of the current is not constant, as it is in my new motor, but decreases with increase of speed. Due to the higher power factor of operation my new motor is of a larger output for the same current supplied and is consequently more efficient in performance than is such a motor. Moreover, Child found that masses of magnetic material in mechanical quadrature with the main field-poles were essential to the successful operation of his motor; but such masses are in no wise essential to the operation of my new motor, nor is the novelty of my invention in any wise affected by the fact that there has been disclosed an electric motor in which the energizing coil or coils are carried wholly by the rotor, while the field-magnet or stationary part is of magnetic material and is not provided with any windings or energizing-coils whatever, and in which the rotor is provided also with a commutator against which press brushes connected directly with the current-mains and adapted to short-circuit the coils of the rotor as they are carried out of the field by said rotor. Such a motor is shown and described in the patent to Lundell, No. 549,876, November 12, 1895, and possesses no characteristic in common with my new motor. I consider it quite inadequate for the purpose for which my new motor is intended. The short-circuiting feature of Lundell's motor is entirely absent in my new motor, while the other feature of this motor—the absence of coils upon the field-magnets—has no place in my new construction, in which the field-cores are surrounded by coils closed upon themselves. The methods of operation of the two motors are essentially different, and the differences just pointed out are in and of themselves sufficient to account for the difference of methods of operation.

I am aware of the patent to Elihu Thomson, No. 363,185, dated May 17, 1887, and I disclaim all that is therein disclosed. The rotor of my new machine is different from that shown and described by Thomson. So is its stator. So is its operation, and so is its theory. Thomson shows (see particularly his Fig. 10) an open-coil armature and specifically states that he intends no current to flow in the coil at certain positions of its rotation. Again, in his Fig. 12 Thomson shows a set of open coils, the continuity of the current from one coil to the next adjacent one being preserved by brushes in duplicate arranged to span the segments of the commutator, leaving at all times an idle coil on the armature. Such method of construction has no part in my structure, in which a closed-coil armature is used, connected, through proper conductors, to a segmental commutator, and at no part of the revolution is a coil without current except as the current may reverse its direction of flow through the coil. This feature is essential to the characteristic performance of my motor, but obviously was not contemplated by Thomson, who in lines 40 to 51 of page 3 of his specification speaks of short-circuiting the coil P of his Fig. 12 and introducing current into his open-coil armature through the brushes. Hence Thomson depends—and he specifically states he so depends—upon the repulsion thrust between the currents in the revolving and stationary coils for the torque with which to produce rotary motion; but an entirely different mode of operation is embodied in my structure, in which, due to the closed and completely-interconnected circuit of the armature-coils, the rotor operates on account of the product of the armature-current and the component of flux in mechanical quadrature therewith, just as is true with direct-current series motors. The desirable characteristics of my new structure are lacking in a machine which, like that described by Thomson, omits this feature. My new structure is a variable-magnetism machine, while Thomson describes a constant-magnetism motor. Mine is a series-induction machine, while Thomson's is essentially a "shunt-motor."

What I claim is—

1. A single-phase alternating-current generator made up of a plurality of field-core sections; a plurality of field-coils one on each section and each coil closed upon itself and free from connection with the others of said coils; and an electric circuit including a rotor provided with a commutator; a plurality of sets of brushes adapted to contact with said commutator; lead-wires; and a switch for connecting at will either of said sets of brushes with said lead-wires.

2. A single-phase alternating-current generator made up of a plurality of field-magnets each provided with a winding each closed upon itself; and an electric circuit comprising a rotor provided with a commutator; a plurality of sets of brushes adapted to contact with said commutator; a transformer; and a switch adapted to bring either set of said brushes into electrical connection with said transformer at will.

3. A single-phase alternating-current machine made up of field-magnets having windings closed upon themselves; and an electric circuit including a rotor provided with a commutator; a plurality of sets of brushes adapted to contact with said commutator; and a reversing device by which current may be led to said rotor from said lead-wires or led from said rotor to said lead-wires, as desired.

4. A variable-magnetism alternating-current machine made up of a plurality of field-core sections the cross-section of which is just sufficient to accommodate the flux at starting, said flux decreasing with increase of speed; field-coils on said sections and closed upon themselves; and an electric circuit including a rotor provided with a commutator; brushes adapted to contact with said commutator; and lead-wires connected to said brushes.

5. A single-phase variable-magnetism alternating-current machine made up of a plurality of field-core sections; field-coils upon said sections, said coils being closed each upon itself and free from connection with any outside source of current; a rotor provided with a commutator; brushes adapted to contact with said commutator; lead-wires which connect said brushes to a source of alternating single-phase current; the relation of the parts of the structure being determined by making the core-sections of a cross-section just sufficient to accommodate the flux at starting, which flux decreases with increase of speed.

6. A single-phase variable-magnetism alternating-current machine comprising field-core sections; field-windings upon said core-sections, said windings being closed each upon itself and free from connection with any outside source of current; a source of single-phase alternating current; a rotor provided with a commutator; a plurality of sets of brushes which electrically connect said commutator with said source, one set of brushes being active while the other is inactive; and means for bringing said rotor to rest from any speed whatever, said means comprising a device for disconnecting one set of said brushes from said source and connecting the other set of brushes to said source to reverse the direction of the torque and change the action of the machine from that of a motor to that of a generator while the rotor comes gradually to rest.

7. A single-phase variable-magnetism alternating-current machine comprising a plurality of field-core sections; field-windings upon said core-sections each winding being closed upon itself and free from connection with any outside source of current; a source of alternating single-phase current; a rotor provided with a commutator; means for driving said rotor to any speed, said means comprising a set of brushes and a device for connecting them with said source; means for bringing said rotor to rest from any speed whatever, and changing the action of said rotor from that of a motor to that of a generator, said last-named means comprising a second set of brushes capable of connection with said source by said device to reverse the torque acting upon said rotor; said device being arranged to disconnect one set of said brushes when it connects the other set of said brushes.

Signed at said Ithaca, this 11th day of December, 1903, in the presence of two witnesses.

ADDAMS STRATTON McALLISTER.

Witnesses:
 J. S. SHEARER,
 FREDERICH BEDELL.